Dec. 20, 1927.
A. LIPETZ
1,653,364
MOTOR DRIVING CONNECTION FOR ELECTRIC LOCOMOTIVES
Filed May 12, 1926
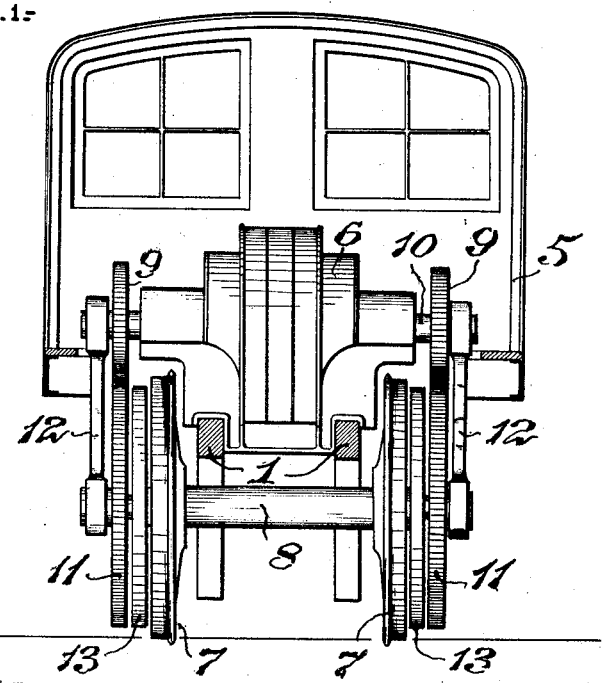
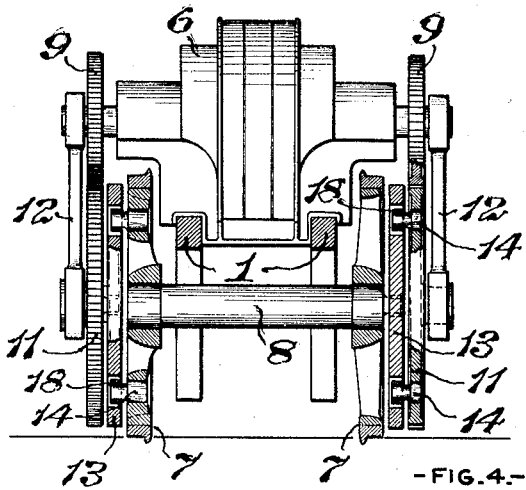
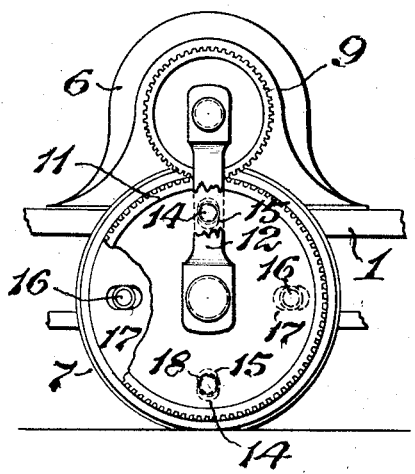
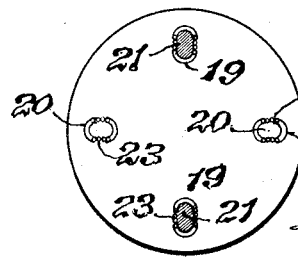
WITNESSES
A. S. Vanderbilt
S. R. Bell
INVENTOR
Alphonse Lipetz
by Snowden Bell
Atty.

Patented Dec. 20, 1927.

1,653,364

UNITED STATES PATENT OFFICE.

ALPHONSE LIPETZ, OF SARATOGA SPRINGS, NEW YORK.

MOTOR DRIVING CONNECTION FOR ELECTRIC LOCOMOTIVES.

Application filed May 12, 1926. Serial No. 108,454.

My invention relates to a driving connection between a motor, mounted in the body or superstructure of an electric locomotive, and the driving wheels of the locomotive. My invention has for its object to provide for vertical displacement of the body, and motor carried thereby, with relation to the driving wheels and without disrupting the driving connection between the motor and the driving wheels. To this end a power transmitting disc is mounted between a face of a driving gear and a face of a driving wheel to be rotated. The disc is provided with radially extending slots in which are received axially extending pins carried by the driving gear and the driving wheel which it rotates. With this structural disposition of members relative movement of the driving gear and the rotated driving wheel, transversely of their axes, is provided, while, at the same time, a continuity of the rotative driving connection between the driving gear and the rotated driving wheel is obtained.

The improvement claimed is hereinafter fully set forth.

In the accompanying drawing: Figure 1 is a vertical transverse section through an electric locomotive, illustrating an application of my invention; Fig. 2, a partial similar section, in fuller detail; Fig. 3, a vertical section, on the line III, III of Fig. 2; and, Fig. 4, a similar section, illustrating a structural modification.

In the practice of my invention, referring descriptively to the specific embodiment thereof which is herein exemplified, the frame, 1, of an electric locomotive, supports a cab or superstructure, 5, in which there is installed a motor, 6. A pair of driving wheels 7 is secured upon an axle, 8, and power transmitted from the motor, 6, to the driving wheels, produces the tractive effect which enables the locomotive to haul the load.

Driving connections between the motor 6, and the driving wheels, 7, include a pair of gear wheels, 9, mounted on the opposite ends of the motor shaft, 10, and having intermeshing relation with a pair of gear wheels, 11. The gear wheels, 11, are mounted opposite the outer faces of the driving wheels, 7, and are journaled for rotation in the lower ends of a pair of supporting bars, 12, suspended from the extremities of the shaft 10.

In order to transmit power from the gear wheels, 11, to the driving wheels, 7, power transmitting discs, 13, are interposed between the gear wheels and the driving wheels, the discs being adapted to be rotatively driven by lugs or pins 14 projecting from the inner faces of the driving gears, into openings, 15, provided for that purpose in the bodies of the discs 14. In like manner, lugs or pins, 16, located on a diameter at a right angle to the diameter on which the pins, 14, are located project from the outer faces of the locomotive driving wheels, 7, into openings, 17, in the discs 13. It will thus be seen that rotary motion or driving torque imparted to the discs, 13, by the engagement of the pins 14, of the driving gears, therewith, is, in turn, transmitted to the driving wheels, 7, by the engagement of the discs with the pins, 16, carried by the driving wheels.

A distinguishing feature of the invention resides in a provision that is made for vertical displacement of the motor and connected parts, with relation to the driving wheels. By reference to Fig. 3 of the drawing, it will be seen that the openings, 15, in which the pins, 14, are received, and the openings, 17, in which the pins, 16, are received, are elongated radially or diametrically, with relation to the circular area defined by the disc.

The elongation of the disc openings, 15 and 17, provides clearance for relative vertical movement of the gear wheels, 9, and the driving wheels, 7, when either the pins, 14, or the pins, 16, lie in or near the line of the vertical diameter of the disc. Vertical displacement of the gears, 9, and wheels, 7, may also take place when the two pairs of pins lie on diameters extending diagonally through the centre of the disc on opposite sides of its vertical and horizontal diameters, the vertical movement tending to distribute itself between the two pairs of pins and slots. It will thus be seen that relative vertical movement of the parts referred to, can take place under all conditions of operation, and without in any manner interfering with the rotation of their driving wheels through the connection with the motor.

In order to reduce friction between the pins and the walls of the slots, anti-friction bushings or rings, 18, are mounted to rotate on the pins, 14 and 16, as the rings engage the side walls of the slots or openings, 15 and 17.

As shown in Fig. 4 of the drawing, the disc member, 13 is provided with two pairs of slots, 19 and 20, disposed on diameters perpendicular to each other, as in Fig. 3. In this form of the invention, the lugs, 21 and 22, corresponding to the pins, 14 and 16, of Fig. 3, are elongated in one cross-sectional direction, to provide more material in the pin, with correspondingly increased strength.

In the form of the invention shown in Fig. 4 provision is made for reducing the friction by increasing the width of the slots, 19 and 20, to provide seats for anti-friction rollers 23.

I claim as my invention and desire to secure by Letters Patent:

1. In a driving connection for electric locomotives, the combination of a locomotive driving wheel; a motor driven rotatable member, mounted to rotate on an axle substantially parallel with the axis of rotation of said driving wheel; a power transmitting disc, mounted between the rotatable member and the driving wheel; and axially extending pins carried by the confronting faces of the rotatable member and the driving wheel, said power transmitting disc being provided with openings, in which said pins are received, whereby rotative motion is transmitted from the driven member, through the power transmitting disc to the driving wheel.

2. In a driving connection for electric locomotives, the combination of a locomotive driving wheel; a motor driven gear wheel mounted to rotate on an axis substantially parallel with the axis of rotation of said driving wheel; a power-transmitting disc mounted between the rotatable member and the driving wheel; and axially extending pins carried by the confronting faces of the rotatable member and the driving wheel, said power-transmitting disc being provided with openings in which said pins are received, and said openings being elongated to provide relative movement of the gear wheel and driving wheel in directions transverse to the axis of rotation.

3. In an electric locomotive, the combination of a motor mounted in the body portion of the locomotive; a pair of driving wheels, mounted on an axle substantially parallel with the motor shaft; a gear wheel carried by the motor shaft; a gear wheel, meshing with said gear wheel and supported adjacent the outer face of one of the driving wheels for rotation about an axis substantially parallel with the axis of rotation of the driving wheel; and means, interposed between said gear wheel and said driving wheel, for transmitting power from said gear wheel to said driving wheel, such means being adapted to permit vertical displacement of the gear wheel, relative to the driving wheel.

4. In an electric locomotive, the combination of a motor mounted in the body portion of the locomotive; a pair of driving wheels mounted on an axle substantially parallel with the motor shaft; gear wheels, carried by the motor shaft, adjacent the opposite ends thereof; gear wheels meshing with the lowermost portions of said gear wheels and supported adjacent the outer faces of said driving wheels for rotation about an axis substantially parallel with the axle of said driving wheels; and power-transmitting discs mounted between the gear wheels and the adjacent driving wheels; and axially extending pins, carried by the confronting faces of the gear wheels and the driving wheels, said power-transmitting discs being provided with openings to receive said pins, and said openings being elongated to provide relative movement of the gear wheels and driving wheels in directions transverse to the axis of rotation.

5. In an electric locomotive, the combination of a motor mounted in the body portion of the locomotive; a pair of driving wheels mounted on an axle substantially parallel with the motor shaft; gear wheels, carried by the motor shaft, adjacent the opposite ends thereof; gear wheels, meshing with the lowermost portions of said gear wheels and supported adjacent the outer faces of said driving wheels for rotation about an axis substantially parallel with the axle of said driving wheels; power-transmitting discs mounted between the gear wheels and the adjacent driving wheels; a pair of pins carried by each of said gear wheels, adjacent opposite ends of the same diameter and extending toward the adjacent driving wheels, said discs being provided with diametrically elongated slots in which said pins are received and a pair of pins carried by the outer faces of each of said driving wheels said discs being provided with diametrically elongated slots to receive said second-named pins, the two sets of slots in said discs being disposed on diameters at right angles to each other.

ALPHONSE LIPETZ.